United States Patent
Jenkins et al.

(10) Patent No.: US 9,595,848 B2
(45) Date of Patent: Mar. 14, 2017

(54) CONTROLLING POWER PROVIDED TO AN AUTOMATED BANKING SYSTEM

(71) Applicants: Randall W. Jenkins, Orrville, OH (US); Songtao Ma, Wadsworth, OH (US); Eric Toepke, Akron, OH (US); Mike Ryan, Canton, OH (US); Natarajan Ramanchandran, Uniontown, OH (US); Thomas D. Ertle, Massillon, OH (US); Timothy Crews, Alliance, OH (US); Willis Miller, Cuyahoga Falls, OH (US); Nicholas Billett, Massillon, OH (US); Steven Shepley, Uniontown, OH (US); Dave Krzic, Wadsworth, OH (US); Victor Cogan, Amherst, OH (US)

(72) Inventors: Randall W. Jenkins, Orrville, OH (US); Songtao Ma, Wadsworth, OH (US); Eric Toepke, Akron, OH (US); Mike Ryan, Canton, OH (US); Natarajan Ramanchandran, Uniontown, OH (US); Thomas D. Ertle, Massillon, OH (US); Timothy Crews, Alliance, OH (US); Willis Miller, Cuyahoga Falls, OH (US); Nicholas Billett, Massillon, OH (US); Steven Shepley, Uniontown, OH (US); Dave Krzic, Wadsworth, OH (US); Victor Cogan, Amherst, OH (US)

(73) Assignee: Diebold, Incorporated, North Canton, OH (US)

(*) Notice: Subject to any disclaimer, the term of this patent is extended or adjusted under 35 U.S.C. 154(b) by 0 days.

(21) Appl. No.: 14/937,085

(22) Filed: Nov. 10, 2015

(65) Prior Publication Data

US 2016/0065002 A1 Mar. 3, 2016

Related U.S. Application Data

(63) Continuation of application No. 14/257,167, filed on Apr. 21, 2014, now Pat. No. 9,184,630, and a
(Continued)

(51) Int. Cl.
*G06Q 40/00* (2012.01)
*H02J 9/06* (2006.01)
(Continued)

(52) U.S. Cl.
CPC .............. *H02J 9/061* (2013.01); *G06F 1/263* (2013.01); *G06F 1/30* (2013.01); *G06F 1/32* (2013.01);
(Continued)

(58) Field of Classification Search
CPC ............ G06Q 20/1085; G06Q 20/207; G06Q 20/209; G06F 1/30; G06F 1/32; H02J 3/005
(Continued)

(56) References Cited

U.S. PATENT DOCUMENTS

RE30,773 E * 10/1981 Glaser .................... G06Q 40/02
235/379
8,227,936 B1 * 7/2012 Folk ...................... G07F 19/202
307/64
(Continued)

FOREIGN PATENT DOCUMENTS

JP WO 2011033351 A1 * 3/2011 ............. G06F 1/189

*Primary Examiner* — Laura Gudorf
(74) *Attorney, Agent, or Firm* — Black, McCuskey, Souers & Arbaugh, LPA

(57) ABSTRACT

In an example embodiment, an automated banking machine causes financial transfers related to financial accounts that correspond to data read from user cards. The automated banking machine also includes devices that control the
(Continued)

supply of power to included devices to facilitate the completing a transaction when a decline or loss of power is encountered.

20 Claims, 6 Drawing Sheets

Related U.S. Application Data continuation-in-part of application No. 13/567,023, filed on Aug. 4, 2012, now Pat. No. 8,657,188, which is a continuation of application No. 13/324,252, filed on Dec. 13, 2011, now Pat. No. 8,579,191.

(60) Provisional application No. 61/813,801, filed on Apr. 19, 2013, provisional application No. 61/459,593, filed on Dec. 14, 2010, provisional application No. 61/572,328, filed on Jul. 14, 2011.

(51) Int. Cl.
| | | |
|---|---|---|
| *G07F 19/00* | (2006.01) | |
| *G06F 1/32* | (2006.01) | |
| *G06F 1/26* | (2006.01) | |
| *G06F 1/30* | (2006.01) | |
| *G06Q 20/10* | (2012.01) | |

(52) U.S. Cl.
CPC ....... *G06Q 20/1085* (2013.01); *G07F 19/207* (2013.01); *G07F 19/209* (2013.01)

(58) Field of Classification Search
USPC ........ 307/18, 43, 65; 713/300; 235/379, 380
See application file for complete search history.

(56) References Cited

U.S. PATENT DOCUMENTS

| | | | | |
|---|---|---|---|---|
| 2008/0084185 | A1* | 4/2008 | Nakazawa | H02J 9/061 320/128 |
| 2008/0111424 | A1* | 5/2008 | Yeh | H02J 7/34 307/65 |
| 2009/0236913 | A1* | 9/2009 | Mariasis | H02J 9/062 307/66 |
| 2011/0089759 | A1* | 4/2011 | Pan | H02J 3/02 307/25 |
| 2012/0304204 | A1* | 11/2012 | Nishimura | H04N 21/237 725/1 |

* cited by examiner

CONTROLLING POWER PROVIDED TO AN AUTOMATED BANKING SYSTEM

CROSS REFERENCE TO RELATED APPLICATIONS

This application is a continuation of U.S. patent application Ser. No. 14/257,167 filed on Apr. 21, 2014 that claims benefit pursuant to 35 U.S.C. §119(e) of Provisional Application No. 61/813,801 filed Apr. 19, 2013, the contents of which are hereby incorporated by reference in their entirety. This application is a continuation-in-part of U.S. application Ser. No. 13/567,023, now U.S. Pat. No. 8,657,188, filed on Aug. 4, 2012 that is a continuation of application Ser. No. 13/324,252, now U.S. Pat. No. 8,579,191 filed Dec. 13, 2011, which claims benefit pursuant to 35 U.S.C. §119(e) of provisional applications 61/459,593 filed Dec. 14, 2010 and 61/572,328 filed Jul. 14, 2011. The disclosures of the aforementioned applications are herein incorporated by reference in their entirety.

TECHNICAL FIELD

This invention relates to automated banking systems.

BACKGROUND

Automated banking machines, for example an automated teller machine or "ATM," may include a card reader that operates to read data from a bearer record such as a user card. Automated banking machines may operate to cause the data read from the card to be compared with other computer stored data related to the bearer or their financial accounts. The machine operates at least in part in response to the comparison determining that the bearer record corresponds to an authorized user, to carry out at least one transaction which may be operative to transfer value to or from at least one account. A record of the transaction is often printed through operation of the automated banking machine and provided to the user. Automated banking machines may be used to carry out transactions such as dispensing cash, the making of deposits, the transfer of funds between accounts and account balance inquiries. The types of banking transactions that may be carried out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, and other types of transactions. For purposes of this disclosure an automated banking machine, automated transaction machine or an automated teller machine (ATM) shall be deemed to include any machine that may be used to automatically carry out transactions involving transfers of value.

BRIEF DESCRIPTION OF THE DRAWINGS

The accompanying drawings incorporated herein and forming a part of the specification illustrate the example embodiments.

OVERVIEW OF EXAMPLE EMBODIMENTS

Figure 1:
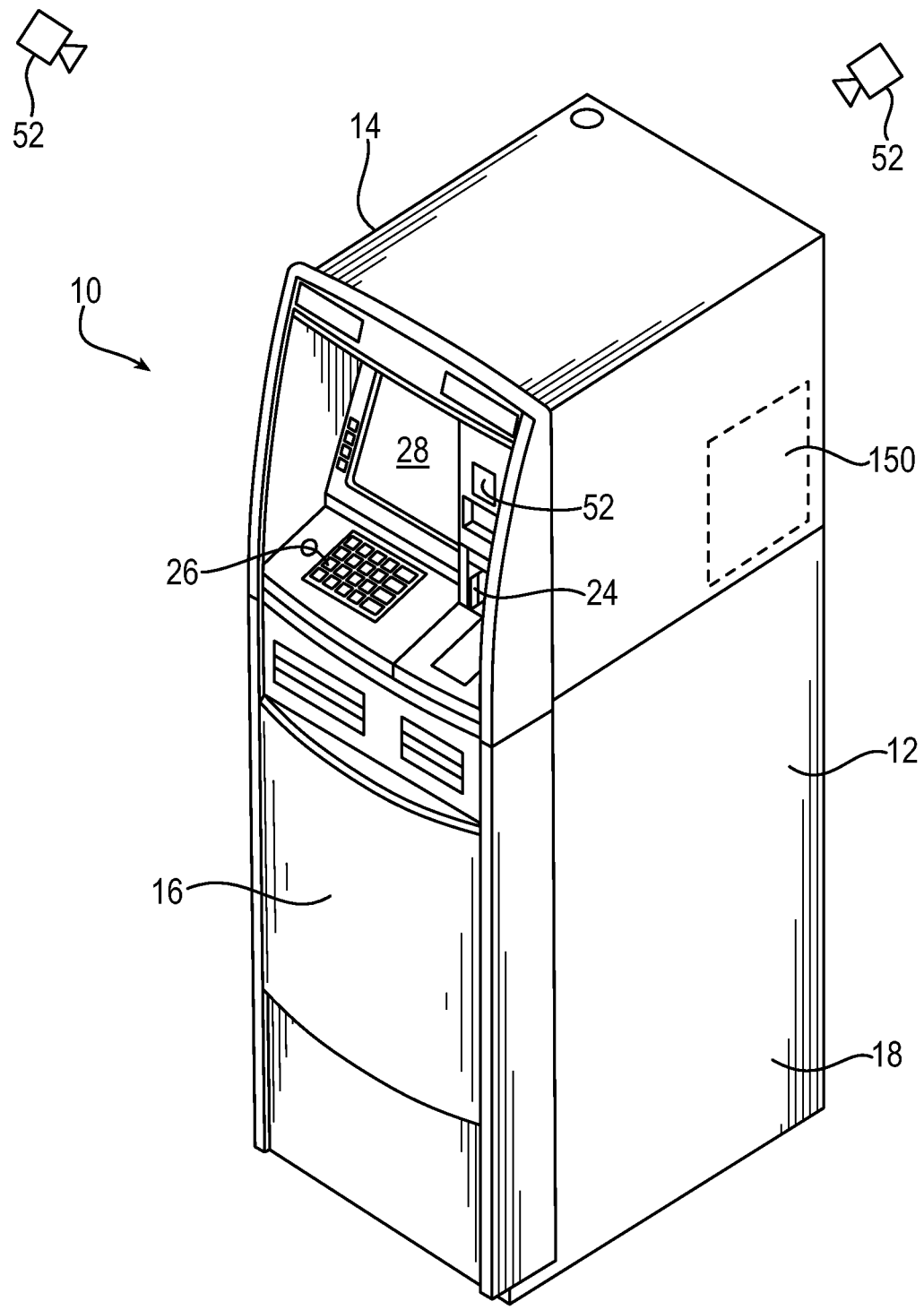
FIG. 1 is a schematic representation of an example automatic banking machine.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein An apparatus comprising an automated banking machine that is operable to cause financial transfers responsive at least in part to data read from data bearing records. The automated banking machine comprises a reader that is operable to read user data that corresponds to financial accounts, a display, a receipt printer, a cash dispenser, a terminal processor, a power control processor, and a plurality of power sources. The terminal processor is in operative communication with the reader, the display, the receipt printer, and the cash dispenser, and is operable to carry out a financial transaction to cause user card data to be read from a user card through operation of the reader, a determination to be made that the user card data corresponds to a financial account authorized to have the transaction conducted through operation of the machine, the cash dispenser to dispense cash responsive at least in part to the determination, the financial account to be assessed a value corresponding to the dispensed cash, the receipt printer to produce a receipt corresponding to the value. The plurality of power sources includes a coupler to a supply of external household current and at least one alternative power source, wherein the plurality of power sources are in operative connection with the power control processor. During the financial transaction the power control processor is operable to cause power delivered from the coupler to be used to operate at least reader, the display, the receipt printer, the cash dispenser or the terminal processor, and upon sensing a decline in available power from the coupler, the power control processor is operable to selectively employ power from the at least one alternative power source to operate one of a group consisting of the reader, the display the receipt printer, the cash dispenser, the terminal processor, or any combination of the reader, the display the receipt printer, the cash dispenser, the terminal processor to complete the transaction.

In accordance with an example embodiment, there is disclosed herein an apparatus comprising an automated banking machine operable to cause financial transfers responsive at least in part to data read from data bearing records. The automated banking machine comprises a reader that is operable to read user data that corresponds to financial accounts, a display, a printer, a cash dispenser, a terminal processor, a plurality of power sources, and a power control processor. The terminal processor is in operative connection with the reader, the display, the printer and the cash dispenser, and is operable to operate in carrying out a financial transaction to cause user card data to be read from a user card through operation of the reader, a determination to be made that the user card data corresponds to a financial account authorized to conduct the transaction via the machine, the cash dispenser to dispense cash responsive at least in part to the determination, the financial account to be assessed a value corresponding to the dispensed cash. The plurality of power sources includes a coupler coupled with a supply of utility provided power, and at least one alternative power source. The at least one alternative power source including one of a group consisting of a solar panel, a battery, an electrical generator, a fuel cell, or any combination thereof. During the transaction the power control processor is operative to make a power control determination corresponding to power currently available from the plurality of power sources, and is operable responsive at least in part to the power control determination determining a loss of power from one of a group consisting of the utility provided power and the at least one alternative power source currently being utilized for machine operation, to cause power from the other of the group consisting of the utility provided power and the alternative power source to supply power to at least one of the group consisting of the reader, the display, the cash dispenser and the terminal processor, until at least the transaction is completed.

Other example embodiments include methods of operation of the power control processor. Particular embodiments include a non-transitory, tangible computer readable medium of instructions for execution by a processor that when executed perform the methods disclosed herein,

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Referring now to the drawings and particularly to FIG. 1 there is shown therein an example embodiment of an automated banking machine that operates to cause financial transfers using information read from data bearing records in the form of user cards generally indicated 10. In the example embodiment automated banking machine 10 is an ATM, however the features described and claimed herein are not limited to any particular type of automated banking machine. The example machine includes a housing 12. In the embodiment shown, housing 12 includes an upper housing area 14 and a lower housing area 16 including a secure chest portion 18. Access to an interior area of the chest portion 18 is controlled by a chest door 20 (see FIG. 2) which when unlocked by authorized persons, enables gaining access to the interior area 22 of the chest area. In an example embodiment, access to the upper housing area 14 may be made through an appropriate opening in the housing 12. The opening to the interior area of the upper housing portion may also be controlled by a movable door. In example embodiments, the opening may be in a front, rear or side of the housing. In other embodiments, the housing may include several openings to the interior area. In an example embodiment, the chest door 20 may be situated at the front of the housing, for so called "front-load" machines or at the rear of the housing for "rear-load" machines. Examples of banking machine housing structures are shown in U.S. Pat. Nos. 7,156,296; 7,156,297; 7,165,767; and 7,004,384 the disclosures of which are incorporated herein by reference in their entirety.

In an example embodiment, the machine 10 includes a number of transaction function devices. These transaction function devices are associated with components of the machine such as a reader which can be a card reader or in particular embodiments may read user data wirelessly from sources other than cards, or both, illustrated as card reader 24 and a keypad 26. The card reader and keypad serve as input devices through which users can input instructions and information. It should be understood that as referred to herein the keypad may include function keys or touch screen areas which may be used in example embodiments to input data into the machine. Machine 10 further includes a visual display 28 generally operative as an output device to provide information to users of the machine. The information provided may include information concerning cash dispensing transactions. The card reader is used to read data from user cards that can be used to identify customer financial accounts to the machine. In some embodiments the card reader may be a magnetic stripe type reader. In other embodiments the card reader may be a smart card reader, a contactless reader such as a radio frequency identification (RFID) reader, an NFC reader or other wireless communication port.

Figure 2:
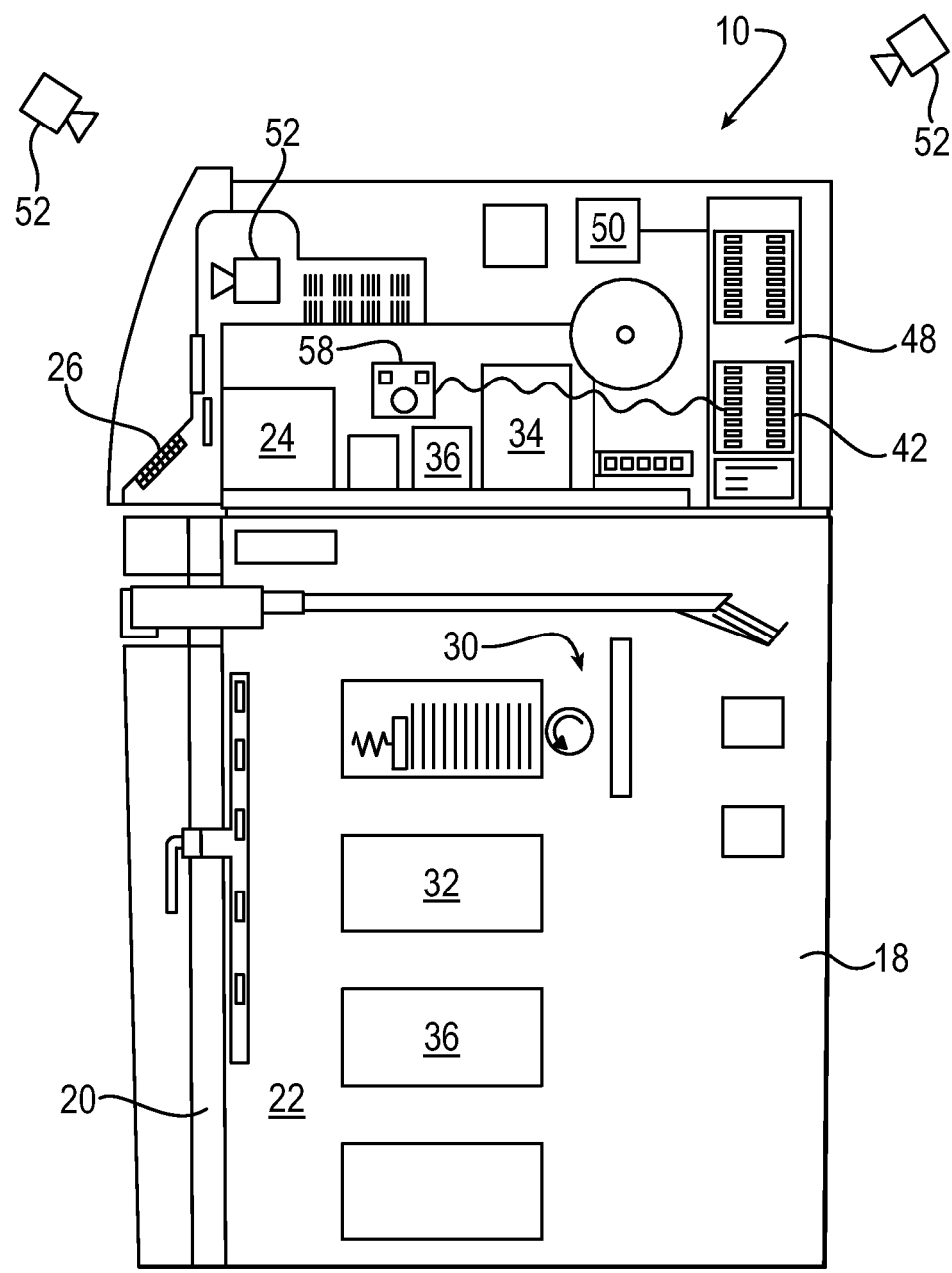
FIG. 2 is a schematic side view of the example automatic banking machine of FIG. 1.

FIG. 2 shows a schematic view of an example hardware configuration of an example machine. Machine 10 includes additional transaction function devices. Such transaction function devices may include a document dispensing mechanism, including a dispenser, schematically indicated 30, which operates to cause sheets such as currency bills or other documents of value stored within the machine to be delivered from or otherwise made accessible from outside the machine to a machine user. Such mechanisms are referred to herein as a cash dispenser. Examples of such cash dispensers are shown in U.S. Pat. Nos. 7,121,461; 7,131,576; 7,140, 537; 7,140,607; 7,144,006; 7,000,832; and 8,052,044 the disclosures of which are incorporated herein by reference in their entirety.

In an example embodiment, machine 10 further includes a depository 32. The depository 32 accepts deposits such as cash or other instruments such as checks from customers. It should be understood that in other example embodiments other types of depositories which accept various types of items representative of value may be used. Examples of depository devices are shown in U.S. Pat. Nos. 7,044,366; 7,156,295; 7,137,551; 7,150,394; 7,021,529; 8,052,046; and 8,061,591 the disclosures of which are incorporated hereby by reference in their entirety. Example machines may also include a note acceptor of the types described in the incorporated disclosures. The example embodiments may include a printer 34 operative to print customer receipts related to the transaction. The example embodiments may include other transaction function devices, such as a coin dispenser, coin acceptor, currency stacker, ticket accepting devices, stamp accepting devices, card dispensing devices, money order dispensing devices, and other types of devices which are operative to carry out transaction functions. Some of these devices may be located in the upper or lower housing areas, all generally schematically represented as 36. It should be understood that the machine shown in the drawings is merely illustrative and automated banking machines of various embodiments may include a variety of transaction function devices and component configurations.

Figure 3:
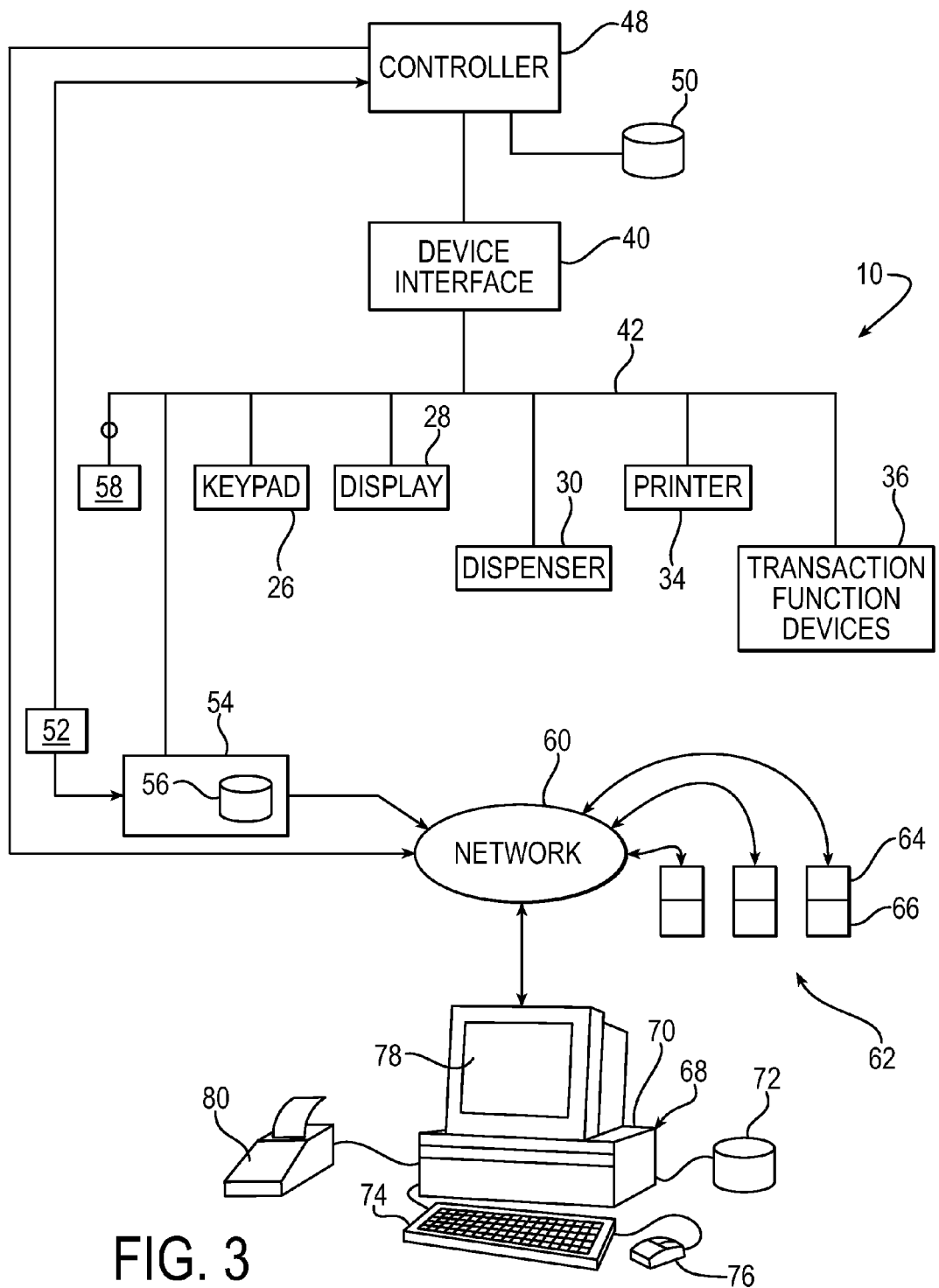
FIG. 3 is a schematic view of a control system for devices within an automatic banking machine.

In an example embodiment, one or more of the transaction function devices, i.e., keypad 26, display 28, dispenser 30, printer 34, or other devices 36 communicate through and are operated responsive to signals passed through device interfaces schematically represented as 40 (see FIG. 3). The device interfaces communicate with the transaction function devices on an interface bus 42 which in example embodiments may be a universal serial bus (USB). The messages which control operation of the various transaction function devices are communicated through the interface bus 42. At least one computer which is also referred to as a terminal controller or processor 48 operates the machine by communicating messages to the device interfaces to control the transaction function devices.

For purposes of simplicity, the illustrated example embodiment is described as having a single controller 48 which controls the operation of devices within the machine. However, it should be understood that such reference shall be construed to encompass multi-controller and multiprocessor systems as may be appropriate in controlling the operation of a particular machine. For example some embodiments may operate using principles described in U.S. Pat. No. 6,264,101 or 6,131,809 or U.S. patent application Ser. No. 13/066,272 filed Apr. 11, 2011 the disclosures of which are incorporated herein by reference in their entirety. The controller is alternatively referred to herein as a terminal processor. As schematically represented, the controller 48 is in operative connection with one or more data stores 50. Such data stores may include for example, articles bearing computer executable instructions such as hard drives, flash memory, firmware or other data storage devices. Such data stores 50 in example embodiments are operative to store computer executable program instructions, values and other information used in the operation of the machine.

With reference to FIGS. 1 and 2, the example embodiment may further include image capture devices such as cameras 52 which provide camera signals representative of what is observed within the field of view of the respective camera. The image capture devices such as cameras 52 may be arranged so as to capture images of portions of the machine, portions of users of the machine, portions of servicers of the machine, or portions of the environment around the machine. For example, an image capturing device 52 may be mounted in supporting connection with the housing of the machine with a field of view encompassing a machine user's face. Another image capturing device may be mounted relative the machine with a field of view of the environment immediately behind a machine user. The field of view of other image capturing devices may encompass areas of the machine accessed by service personnel within the respective fields of view of the devices. It should be understood that the camera configuration shown is example. It should further be understood that embodiments may include analog cameras, digital cameras, iris scanners, fingerprint scanners or other types of devices from which data corresponding to images may be acquired and/or reproduced. Some embodiments may operate in a manner that employs the principles described in U.S. Pat. No. 7,147,147 or U.S. patent application Ser. No. 13/068,592, the disclosures of which are incorporated herein by reference in their entirety.

The images captured by camera(s) 52 may be used, for example, to verify identity and/or provide security for the machine or users thereof. In an example embodiment, the data store 50 may include data corresponding to images of unauthorized users of the machine. In an example embodiment, the controller 48 is able to compare data corresponding to the images captured by camera(s) 52 with data in the data store corresponding to unauthorized users. If the data generated by camera(s) 52 corresponds to unauthorized user data in the data store, the controller is operative to carry out instructions, such as to activate an indicator which indicates the presence of the unauthorized user. The indicator may be an audible alarm, a message to a remote entity, a machine shut-down operation, or any other action able to indicate attempted use of or access to the machine by an unauthorized user. Alternatively, in some example embodiments the data store may be located at the machine or accessed through communications to one or more computers at remote locations. In other embodiments the stored data may correspond to authorized users. Determining through operation of one or more controllers that image data corresponds to an authorized user may permit such authorized users to carry out certain operations. Of course these approaches are example.

In an example embodiment, machine 10 also includes a movable image capture device 58 such as a camera, in operative connection with interface bus 42. When the machine is in an operational mode, movable device 58 may be housed within the upper housing area. Alternately, a movable device may be housed within the lower housing area. Alternatively in some embodiments, the image capture device may be brought to the machine by a servicer and operatively connected to at least one controller, such as by plugging in a cable connected to a camera to a USB port. After a servicer attains access to the interior of the machine housing, the movable device 58 may be utilized to aid servicing of machine components as described in greater detail below.

As schematically illustrated in FIG. 3, in some example embodiments, signals from the camera 52 may be sent to an image recorder device 54 which is connected to the interface bus 42. Image recorder device 54 includes a computer which includes at least one server operating therein, and further includes at least one data store 56. It should be understood that some embodiments may include devices which in addition to image data, acquire sound data, infrared signal data, and other types of data which can be sensed by sensing devices, stored, recovered, and analyzed by the system. This may include for example, sensing images which indicate the relative temperatures of various portions of parts, which temperatures may correspond to abnormal conditions. Image recorder device 54 may also receive inputs from devices such as sensors which can generally sense actions or conditions directly. Image recorder 54 may also receive signals representative of conditions or instructions sent as signals to other devices such as signals on the interface bus 42, timing signals, or others signals usable to operate the image recorder responsive to programmed instructions, time parameters, user inputs, or other conditions or signals. At least one server software function associated with the image recorder device 54 may be in communication with at least one electronic communications network schematically indicated 60. The server may operate to provide at least one uniform resource locator (URL) or other system communication address. Thus, the server may be accessed by other terminals connected to the network. The server may also selectively deliver messages to other network connected computers. The camera signals may alternately, or additionally, be sent to controller 48.

In an example embodiment, terminal controller 48 is in communication with at least one network 60 and is able to be accessed by other terminals connected to the network, as well as able to deliver messages including data corresponding to visual images generated by camera 52 and movable image capture device 58 to connected terminals.

Network 60 may include a local area network such as an intranet or may be a wide area network such as the Internet. Network 60 may include a network that communicates messages in protocols such as TCP/IP. The network may be used to further communicate HTTP messages including records such as HTML, XML, and other markup language documents. Example principles that may be used are described in U.S. Pat. Nos. 7,159,144; 7,162,449; 7,093,749; and 7,039,600 which are incorporated herein by reference in their entirety. Of course, in other embodiments other communications methods may be used.

In the example embodiment shown, a plurality of terminals 62 are shown connected to the at least one network 60. Terminals 62 may include user terminals which may be used to analyze, store, and recover data sent from the machine. Alternative terminals 62 may include document verification terminals for verifying the authenticity of documents, identifying user data or for carrying out other functions. Typically terminals 62 include computers including a browser software component 64 such as Mozilla Firefox™, Mozilla Thunderbird™, Microsoft Internet Explorer™, Google Chrome™ or other types of browsers. Terminals 62 also include other software and hardware components schematically indicated 66 suitable for processing image data, transaction data, and other data that may be obtained by accessing the machine.

Example terminal 68 may be a user terminal, document verification terminal, data storage terminal, data analysis terminal, or other type of terminal for inputting instructions or analyzing data available in the system. Example terminal 68 includes a computer schematically indicated 70 which includes at least one processor and an associated data store schematically indicated 72. The computer 70 may be located within the machine. Alternatively, the computer may be located in a server or other device remote from the machine. For example, the computer may be located in a server that is operatively connected to the machine and also to other machines. For example in some embodiments the server may operate a virtual machine that communicates with devices in the machine to control operation of such devices in the manner of the incorporated disclosure.

Example terminal 68 may be in operative connection with the computer 70 and input devices 74 and 76 which include a keyboard and mouse respectively in the embodiment shown. Of course in other embodiments other types of input devices may be used. Example terminal 68 further includes output devices. The output devices in the example embodiment shown include a monitor with a display 78 and a printer device 80. Of course in other embodiments of terminals other types of output devices may be used. The example terminal 68 includes a computer with a browser component as previously described. The browser in the terminal communicates with the machine through the network 60. Terminal 68 may also have server software operating therein as well as other software components.

Figure 4:
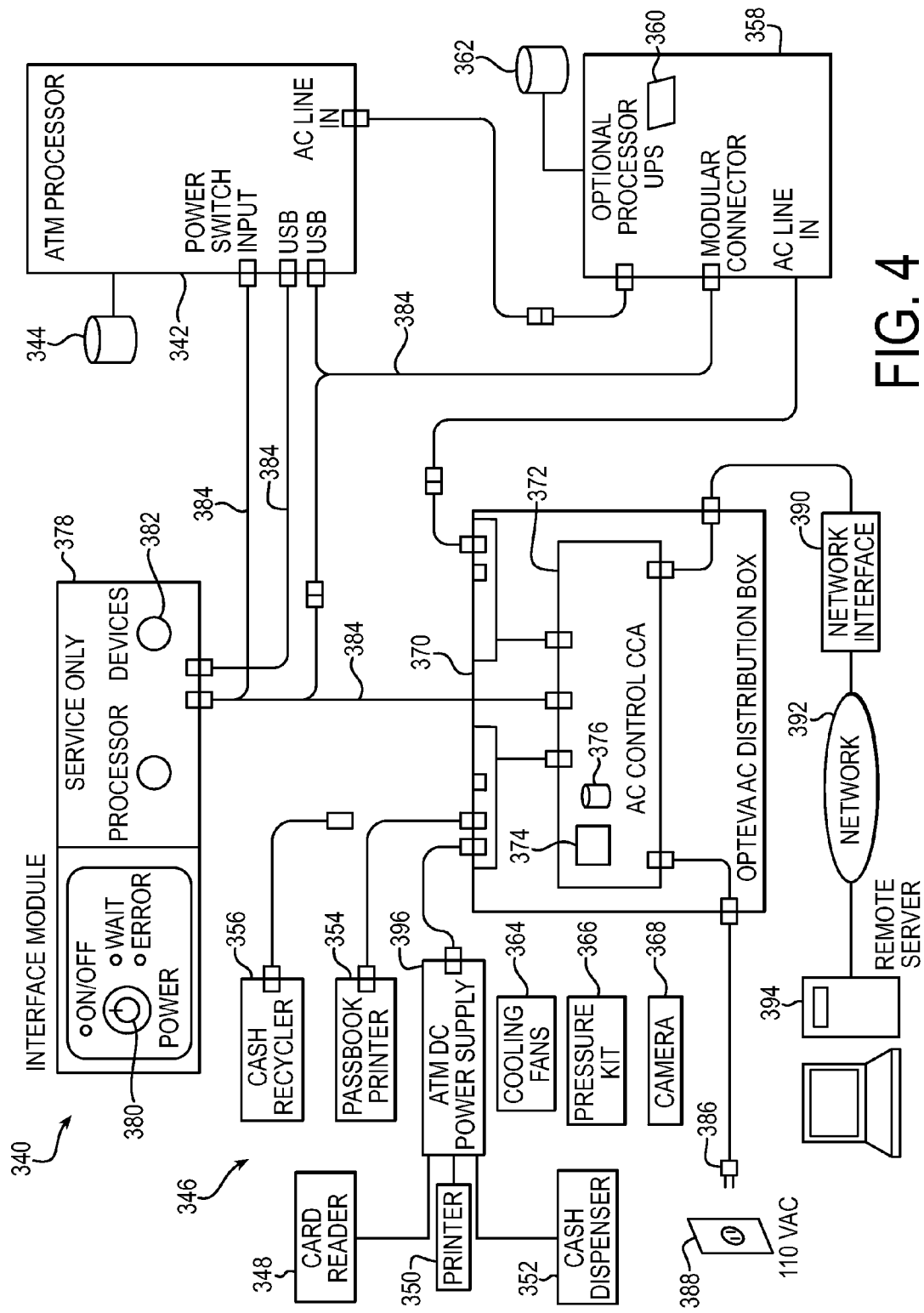
FIG. 4 is a schematic representation of a power control system for use in an example automated banking machine.

The schematic representation of components included in an example automated banking machine 340 are represented in FIG. 4. The components of the automated banking machine 340 represented in FIG. 4 specifically correspond to components used for providing and shutting off electrical power to devices within the machine. The components of the example embodiment are also used in connection with coordinating electrical power supply functions within the machine as well as providing remote status notification and remote control of power functions. Of course it should be understood that this embodiment is example. Automated banking machine 340 includes a controller or terminal processor 342. The terminal processor is in operative connection with one or more data stores schematically represented 344. Although the example embodiment is described as used in connection with a single terminal processor, those skilled in the art should readily appreciate that the principles described herein may be used with automated banking machines having multiple terminal processors or other processors. The automated banking machine also includes a plurality of transaction function devices schematically represented 346. Example transaction function devices include a card reader 348, a printer 350 and a cash dispenser 352. Other example transaction function devices shown include a passbook printer 354 and a cash recycler 356. Other example transaction function devices include a note acceptor which may be of the type described in the incorporated disclosures. It should be understood that these transaction function devices are example, and in other embodiments other or different types of transaction function devices may be included in the banking machine.

As can be appreciated, in the example embodiment the terminal processor 342 executes software instructions included in the at least one data store 344 related to the conduct of financial transactions. The terminal processor is operative to cause operation of the transaction function devices to carry out such transactions. The terminal processor communicates through a suitable control bus or other communications methodology with devices within the machine in the manner described.

The example automated banking machine further includes an uninterruptible power supply (UPS) 358. In the example embodiment the UPS includes a processor 360 which is in operative connection with a data store 362. The UPS operates to supply power when power from an external source is otherwise not available. The example automated banking machine further includes other devices which utilize electrical power. In this example embodiment devices such as cooling fans 364, air pressure control devices 366 and cameras 368 are shown. It should be understood that these devices are merely example of numerous devices that consume electrical power that may be included in the example banking machines.

The example embodiment further includes a power controller schematically represented 370. Power controller 370 includes control circuitry 372. The control circuitry includes at least one processor 374. Processor 374 is in operative connection with at least one data store 376. The automated banking machine further includes a power interface module 378. Power interface module 378 includes one or more input devices schematically represented 380. In the example embodiment the at least one input device 380 includes a rotatable switch. The switch enables a user to provide inputs which correspond to selectable conditions. Of course it should be understood that in other embodiments other approaches may be used. The power interface module further includes output devices 382. In the example embodiment the output devices are operative to indicate status information related to the power control system.

As can be appreciated, in the example embodiment the terminal processor interface module, power controller, UPS and transaction function devices are all within the housing of the automated banking machine. Further the power controller interface module, terminal processor and UPS are operative to communicate within the housing through communication lines schematically indicated 384. In the example embodiment, Universal Serial Bus (USB) communications are used. Of course this approach is example.

In the example embodiment the power controller is in operative electrical connection with an electrical connector or other device for receiving electrical power which extends outside the housing of the automated banking machine. This electrical connection is schematically represented by a plug or a connector 386. In the example embodiment the connector 386 is releasibly connectable with a source of AC power schematically indicated 388. In the example embodiment the source of AC power comprises an electrical outlet which provides 110 volts of alternating current. However, it should be understood that this approach is example and in other embodiments other approaches may be used.

In the example embodiment the power controller 370 is also in operative communication with a network interface schematically indicated 390. In the example embodiment the network interface is a suitable communications card, modem or other device within the machine that is operative to enable the communication of messages between the automated banking machine and remote devices. It should be understood that although the network interface is only shown in operative connection with the power controller, in example embodiments the network interface is operative to provide communications with other components of the machine. This may include for example the communications that relate to the conduct of transactions using the machine as previously discussed. Of course this configuration is example and in other embodiments other approaches may be used.

In the example embodiment the network interface of the machine is in operative connection with at least one external network schematically indicated 392. Network 392 may be one or more suitable public or private networks which enable communications between the automated banking machine and one or more remote servers 394. Further it should be understood that in some embodiments the network may include the Internet or other data or telecommunications network.

The example embodiment of the power control components shown in FIG. 4 may be used advantageously in connection with example automated banking machines to reduce damage that may result due to a failure to appropriately apply power to start, shutdown and/or shut off devices with the machine. For example recommended practice is often to avoid shutting off power to the terminal processor without going through the proper shutdown sequence. A failure to shut down the processor properly may result in corrupted data, or other problems which inhibit reliable operation of the machine. Further turning off power to transaction function devices at inappropriate times may result in malfunctions or damages which require repair. Further in some embodiments of automated banking machines benefits may be derived from conducting power related activities in a particular order. In addition the ability to remotely monitor and/or remotely control the power status of various components within an automated banking machine may prove helpful for numerous activities.

In the example embodiment power from the AC power source 388 is controlled and distributed in the example machine through operation of the power controller 370. As can be seen in FIG. 4 the power controller is operative to provide AC power to the UPS 358. The UPS is operative to provide AC power that is input to the terminal processor 342. The power controller 370 is also operative to supply power to the transaction function devices. As indicated schematically, power to the transaction function devices may include providing power to a power supply suitable for the particular device. This may include for example supplying power to a DC power source 396. The DC power source may then be operative to provide suitable DC power to transaction function devices that utilize DC power in their operation. Further it should be understood that although certain devices in the machine are not shown schematically connected to the power controller, in example embodiments such devices are appropriately connected to receive power therefrom. Further it should be understood that although only a single DC power supply is shown, embodiments may include multiple DC power supplies or other types of power supplies suitable for the particular types of devices used in the machine.

In an example embodiment inputs provided through the input device of the interface module are operative to cause the power controller 370 to carry out a series of steps in accordance with programmed sequences. These programmed sequences generally include supplying and shutting off power to the devices within the automated banking machine. For example if the automated banking machine is in an unpowered state, a user such as a service technician may provide one or more inputs to the interface module indicating that the automated banking machine is to be started. In response to such an input to the interface module, the power controller is operative responsive to communication with the interface module to execute a sequence which places the banking machine in operational mode. This may include for example operating to cause AC power to be supplied to the UPS 358 which delivers AC power to the terminal processor. The sequence may also include causing power to be delivered to the transaction function devices in the machine. In example embodiments power may be supplied to the transaction function devices so that such devices may operate to carry out their initialization routines in accordance with their imbedded software instructions. This may be done so that the devices are in a ready condition so that they can be recognized as present in the machine by the terminal processor as the terminal processor operates to start and place the automated banking machine in a normal operational mode.

In accordance with the programmed instructions which cause the power controller to carry out the sequence, the power controller may thereafter cause one or more messages to be sent to the terminal processor which causes the terminal processor to start. In response thereto the terminal processor begins executing its programmed instructions, communicates to recognize the devices that are connected thereto, and verifies that the processor can carry out an appropriate terminal startup sequence. As a result in the example embodiment if there are no malfunctions, the terminal processor will operate in accordance with its instructions to bring the automated banking machine into an operative condition to carry out financial transactions.

Further in the example embodiment the power controller may operate in response to at least one input to the interface module 378 to take the terminal to a shutoff condition. This may include for example, responsive to receiving at least one input through the interface module, causing the power controller to send at least one message to the terminal processor, instructing the terminal processor to shut down. In response to such message the terminal processor will then go through a shutdown sequence. In the example embodiment during this time period the power controller maintains power supply to the transaction function devices. This may be done in some example embodiments so that an indication is maintained of the presence and operational status of such devices as the terminal processor is shutting down. As can be appreciated removal of power from the devices may result in indications being provided of a malfunction of the devices which the terminal processor may react to in accordance with its programming before it is fully shut down.

In the example embodiment after the terminal processor is shut down the power controller operates in accordance with the program sequence to cause power to be shut off to the transaction function devices. As can be appreciated, in some embodiments this may be done simultaneously or sequentially as would be appropriate for the most reliable shutdown. Further in some example embodiments the power controller may operate to control the UPS to shut off the supply of AC power to the terminal processor. Of course it should be understood that these approaches are examples and in other embodiments other approaches may be used.

In the example embodiment other inputs to the interface module may be useful for conducting diagnostic activities. In an example embodiment the power controller is operative responsive to one or more inputs to the interface module to cause power for one or more of the transaction function devices to be shut off while at the same time maintaining power to the terminal processor. This may be useful for example in situations where a servicer wishes to perform activities that require operation of the terminal processor or where operation of transaction function devices may not be desirable. This may include for example certain diagnostic and test activities.

Further in the example embodiment one or more inputs to the interface module are operative to cause the power controller to send a message that is operative to cause a shut down of the terminal processor. In response to such messages the terminal processor shuts down while power is maintained to the transaction function devices. This may be appropriate for example when the devices are to be tested or diagnosed using inputs or other test data that is supplied by a technician or from a device other than the terminal processor. Of course it should be understood that these approaches are examples and in other embodiments other approaches may be used.

Further in the example embodiment the power controller is operative to determine through its associated programming when the terminal processor is instructed to shut down but does not do so. This may happen in some situations where processes are executing in ways that cannot be terminated through the shutdown command. In the example embodiment when the terminal processor fails to respond to such a shutdown command the power controller is operative to control of the UPS to shut off AC power to the terminal processor. While this condition is generally not desirable, it is sometimes necessary in order to bring the automated banking machine back into operation. Of course these approaches are example and in other embodiments other approaches may be used.

In still other example embodiments the power controller is operative to cause messages to be sent though the communication device 390 to the remote server 394. The messages are indicative of the power status of the various devices. Thus for example for purposes of remote monitoring and control of the automated banking machine the remote server may be operative to monitor the status of the terminal processor, UPS and each of the transaction function devices and other devices in the machine. In the event of a malfunction the device may cease to draw electrical power or may experience an electrical short or other condition which is detected through operation of the power controller. Appropriate messages can then be sent to give notification of this condition to a servicer or other entity associated with the remote server. In addition the power controller may operate in accordance with its programming to attempt to recover from such malfunctions. Of course this approach is example and in other embodiments other approaches may be used.

In other example embodiments the power controller may operate devices in the machine to change their power or operational status in response to messages received from a remote computer. This may include for example a situation where a malfunction is detected in operation of the automated banking machine which is preventing machine operation. Such a malfunction may be determined for example, using principles described in U.S. Pat. No. 7,036,048 the disclosure of which is incorporated herein by reference in its entirety. Responsive to the automated banking machine giving an indication of a malfunction that might be remedied by restarting the terminal processor, one or more messages may be sent from the remote server to the machine. In response to one or more messages the power controller 370 may operate in accordance with its programming to cause the terminal processor 342 to restart. This may include for example causing the terminal processor to operate in accordance with stored instructions associated with its operating system to shut down and then start. Such a restart in an example embodiment causes the terminal processor to go through loading its various software instructions and initializing communications with the various devices in the machine. Such activity will in many instances remedy the condition that is causing the malfunction. As can be appreciated this capability avoids the need for a service technician to visit the machine.

In still other embodiments a condition with a particular transaction function device may be indicated. This condition could be of the type that may be remedied by taking action such as turning the electrical power to the device on and off so as to reinitialize operation or to reset operating parameters. In some example embodiments messages from the remote server are operative to cause the power controller to shut off power to the affected device and to thereafter resupply power. In some situations this may be done to a single device while in other situations it may be accomplished by shutting off power to a power supply which supplies power to a plurality of devices. Further in some embodiments power may be shut off and resupplied to devices in a particular order or time sequence so as to facilitate the re-initialization or operational status thereof. This is accomplished in accordance with the computer executable instructions carried out by the power controller and/or messages received by the machine from one or more remote servers. Of course these approaches are example and in other embodiments other approaches may be used.

In still other situations the example embodiment may facilitate operational capabilities of the automated banking machine. For example the terminal processor may be operated in accordance with instructions to download software patches, software upgrades, additional programs or other instructions from a remote source through a communications device on an automated banking machine. Once these computer executable instructions have been downloaded it may be necessary to cause these instructions to be effectively implemented in the permanent configuration of the machine by shutting down and then restarting the machine. In the example embodiment the power controller is operative responsive to one or more messages received through the network interface to cause the terminal processor to shut down, after such instructions have been received. Thereafter once the processor has been shut down the power controller operates to supply power and restart the terminal processor, thus effectively installing the software changes. Of course these approaches are example and in other embodiments other approaches may be used.

In still other embodiments messages received by the automated banking machine may be operative to cause the power condition of devices to be changed. This may be done for example at times when it is desirable for the automated banking machine to be inoperative. Thus for example, if the automated banking machine is located in a shopping mall that is closed during the night for a period of time, messages may be sent from the remote server to the automated banking machine which cause the power controller to execute one or more sequences of program instructions which cause the machine to shut down. Thereafter at a time before the facility in which the machine is located is to open, one or more messages may be sent to the machine from the remote server which will be operative to cause the machine to execute one or more sequences of program instructions to cause the machine to start up. Alternatively or in addition, in some embodiments messages may be sent to the machine to cause power to be shut off to devices while maintaining the processor in operating condition. This may be done for example during time periods when no transactions are to be carried out such as when the facility where the machine is installed, is closed. In this status the processor would continue operating but devices for carrying out transactions will be inoperable until further messages causing the restoration of power to those devices are received. Such approaches may be useful for purposes of conserving electricity during times when transactions cannot be conducted. Alternatively or in addition in some embodiments power may be turned on or shut off to various devices for purposes of providing additional or different security features depending on the local circumstances associated with the machine. This might include for example, turning on devices operatively connected with the machine so as to sense activity occurring in proximity to the machine during hours when no one is supposed to be present and giving notification thereof remotely and/or operating other connected systems such as sounding alarms. Numerous other or different approaches may be taken depending on the particular automated banking machine and its capabilities.

It should be further understood that while one power supply has been discussed in connection with this particular description, embodiments of example automated banking machines may include multiple power supplies. This may include, for example, power supplies associated with devices that operate a different voltage levels and/or with different AC and/or DC types of power within the machine. The principles described herein may be used to operate and control devices so as to avoid malfunctions due to exceeding the capabilities to provide power of such one or more power supplies.

It should be understood that the control and allocation of power described in the above example embodiments may be useful for systems that have multiple devices attached to a single power supply, where the power supply does not have sufficient power delivery capacity to operate all devices simultaneously, or alternatively where such power supply may not have the capability to operate all such devices in all possible modes of operation simultaneously. In addition in example embodiments, power from the power supply may be utilized more efficiently. This may result in a smaller and lower cost power supply being needed relative to a larger power supply that might be required so as to provide the necessary amount of power to multiple devices under a broader spectrum of possible conditions. By being able to reduce the size of one or more power supplies in the machine, the automated banking machine may be able to operate generally more efficiently, thus reducing energy consumption and prolonging the life of the power supply and/or transaction function devices within the machine.

Other example embodiments of an automated banking machine may operate in response to multiple different power supply sources in a manner like that previously discussed. Example power controllers may operate to monitor available power from the different power supply sources so as to selectively utilize power from the different sources or to combine power available from different sources to accomplish operation of different transaction function devices. Such available power supply sources may include solar panels, wind generation devices, power supplied by an external source such as a utility (e.g., household current), battery power, a generator or other sources of electrical power that can be utilized in operating the transaction function devices. Further it should be understood that in example arrangements the power controller may operate in accordance with its programming to monitor the available power from a power source currently being utilized and to rapidly change to an alternative available power source during the conducting of a transaction as necessary to maintain uninterrupted operation of the machine. Thus for example in some example embodiments in the case of an automated banking machine that is currently running off household current as the power supply, the power controller operates to sense a decline in power such as a blackout or brownout condition and maintains the power available to the terminal processor and the operating devices by utilizing alternative available power sources to complete the transaction functions that are currently in process. For example in some example arrangements where the machine may be operating its transaction function devices from a household current power source, a cutoff or drop in available power from that source may cause the power controller to operate in accordance with its programming to maintain the necessary supply of power from a battery, solar panel, electrical generator (e.g., wind power, fossil fuel power, geothermal power, compressed gas power, etc.) or other currently available power source. Further in some example arrangements, the power controller may operate in accordance with its programming to cause a generator or other source of power to begin operating in response to power loss. For example, in response to sensing a loss of power, the power controller may operate to switch power through one or more power delivery devices so that power is delivered from an immediately available source such as battery, and a generator or similar source is caused to start operating. Thereafter once the generator is operative and has power available, the power controller can change the one or more power delivery devices so that power from the generator is used in whole or in part for operating one or more of the devices of the banking machine. In this way if power is lost or degraded during a transaction, the transaction can nonetheless be completed for the particular customer to avoid situations where transactions are incomplete, or lost as a result of damage to the machine due to power availability anomalies.

In some example arrangements the power controller (alternatively referred to herein as a power control processor) may operate in accordance with its programming to maintain machine operation when a power source has been cut off or degraded for at least for a period of time, using the alternative sources of power that are available. Thus, for example, if a machine is initially operating using a source of household current which is lost, but the power controller determines whether suitable alternative power is available from other sources such as a battery, solar panel, electrical generator or other source, so that the machine may continue to operate to perform transactions for customers for as long as such alternative sources remain available. Alternatively if a currently used power source becomes unavailable for a time that extends beyond the period necessary to complete a transaction that is currently in process, some arrangements may operate in accordance with their programming to cause an orderly shutdown of the devices in the machine utilizing the available alternative power sources during the shutdown period. The power controller may operate in accordance with its programming to shut the machine down and then operate using battery or other available power to monitor until it is detected that the normal primary source of power such as household current has returned and remains stable and available for a set period. For example in such arrangements the power controller may then operate in accordance with its programming responsive to return of the household current to cause an orderly startup of the transaction function the devices and then the central processor of the machine in a manner like that previously described. In each case power may be withdrawn and reinstated to devices in predetermined sequences appropriate to avoid problems. For example in such sequences power may be withdrawn or supplied to various devices at different times in a particular order. Further in some arrangements power may be withdrawn or reinstated to the terminal processor as either the first or last step in the sequence depending on what is the best approach for avoiding problems. Of course it should be understood that these approaches are examples and in other arrangements other approaches may be used.

In some example embodiments the power controller or other controller operated in the machine may operate in accordance with its programming to store in one or more data stores data corresponding to the power related features associated with the plurality of devices included in the machine. For example in some arrangements at least one processor may periodically gather and store data regarding power consumption of each a plurality of transaction function devices that is consuming power in the machine. Other parameters such as performance of power supplies, battery voltage, battery charge levels, household current levels, household current fluctuations, available power from solar panels, power fluctuations from solar power, wind power availability, generator operating data and other different parameters may be stored in at least one data store for use in connection with analyzing operational properties of the machine and/or the power sources. For example in some arrangements such data may be reported through network communications to one or more remote computers and data stores. Such data may be useful in evaluating performance characteristics associated with different devices in the machine, batteries or other power sources, power supplies or other items. Such data may identify conditions that correspond to degradation of certain items or developing problems that may need to be remedied through service activities or replacement of parts within the machine. In addition by having such data available for a significant population of automated banking machines provides capabilities to analyze the characteristics to identify potential problems and opportunities for improvements with certain machines.

In still other example embodiments, the functions as described herein as associated with the power controller may alternatively be distributed to processors that operate in transaction function devices and other devices of the machine. Thus transaction function device modules may be programmed to interact with other modules and/or other devices for purposes of determining certain parameters such as the levels of power draw by the module and/or by other modules and available power supply capabilities of the power supplies on which the particular device modules are dependent. In this manner one or more processors of each of the transaction function devices may be capable of calculating if the power supply has available power to carry out functions that the particular device may be directed to carry out. By providing the processing capability within multiple transaction function devices to monitor their own power draw activities as well as to receive data that effectively enables monitoring other devices, the available capabilities for monitoring and controlling the power consumption may be more effectively carried out. Of course these approaches are example and in other embodiments other approaches may be used.

In other example embodiments, the principles described herein may be applied not only to operation of devices within the machine but also to operation of external lighting and other devices that may be associated with the automated banking machine. For example in some example embodiments, automated banking machines may have associated therewith external lighting that is operative to illuminate the area of the machine and to also provide a safe operating environment for users of the machine. This may be done, for example, in a manner described in U.S. Pat. No. 6,305,602, the disclosure of which is incorporated herein by reference in its entirety.

In such example embodiments, at least one power controller may operate to determine the need for example, to activate supplemental lighting associated with customer operation of an automated banking machine. This may be done, for example, by the same or different power controller that allocates power for the operation of the automated banking machine. For example, in some example embodiments, at least one separate power controller associated with controlling external lighting usage may be operated primarily to conserve electrical power as needed so as to reduce total energy costs associated with the operation of an automated banking machine in an outdoor environment. Such a power controller may operate in accordance with its programming to monitor light levels in one or more locations in an area associated with the machine. The at least one power controller for the external light sources may operate in accordance with its programming to only cause the operation of additional lighting sources when the ambient levels of lighting are below a particular level.

In some alternative embodiments, the at least one power controller may operate in accordance with its programming to detect the presence of an individual and/or their vehicle within the vicinity of a given automated banking machine. This may be done through appropriate types of sensors for persons or vehicles which are adapted to sense the presence thereof in an area indicative that the person or vehicle may be approaching the automated banking machine and/or is continuing operation of the machine. In such situations responsive to detection by the one or more sensors, the at least one power controller for the external lighting may operate in accordance with its programming to increase lighting levels in the vicinity of the machine in anticipation of future machine operation. The power controller may also operate to maintain such increased lighting levels during the time period that the machine is being operated as well as when the user of the vehicle remains in proximity to the ATM after a transaction has been conducted. For example, after a transaction is sensed as having been completed and the sensors for detection of a user or their vehicle indicate that the user has moved away from the machine, the at least one power controller may operate in accordance with its programming to reduce the lighting levels in the area of the machine so as to conserve power.

For example in some example embodiments, external lighting sources may be varied in both color and/or intensity responsive to operation of the power controller associated therewith. In some embodiments, for example, multiple color light emitting diodes or other suitable multicolor lighting may be provided in the area of the machine. The power controller may operate such light sources at a low level and/or in a particular color scheme which the bank finds attractive for inducing customer operation when no customer is present. This might be for example a relatively low level of lighting in a particular color. This might further be a color that is selected based on the ability to produce light with lower power draw. Alternatively it could be a color associated with the bank's particular brand. Upon one or more sensors sensing a vehicle or a person in the area of the machine, the at least one processor could then increase light output and/or activate other light sources so as to bring the lighting intensity up to a relatively high level of white light or a mixture of light while the user conducts their transaction and until they are detected as having moved away from the machine. Thereafter the power controller may return the lighting to the prior condition. Of course these approaches are example and in other embodiments, other approaches may be used.

Figure 5:
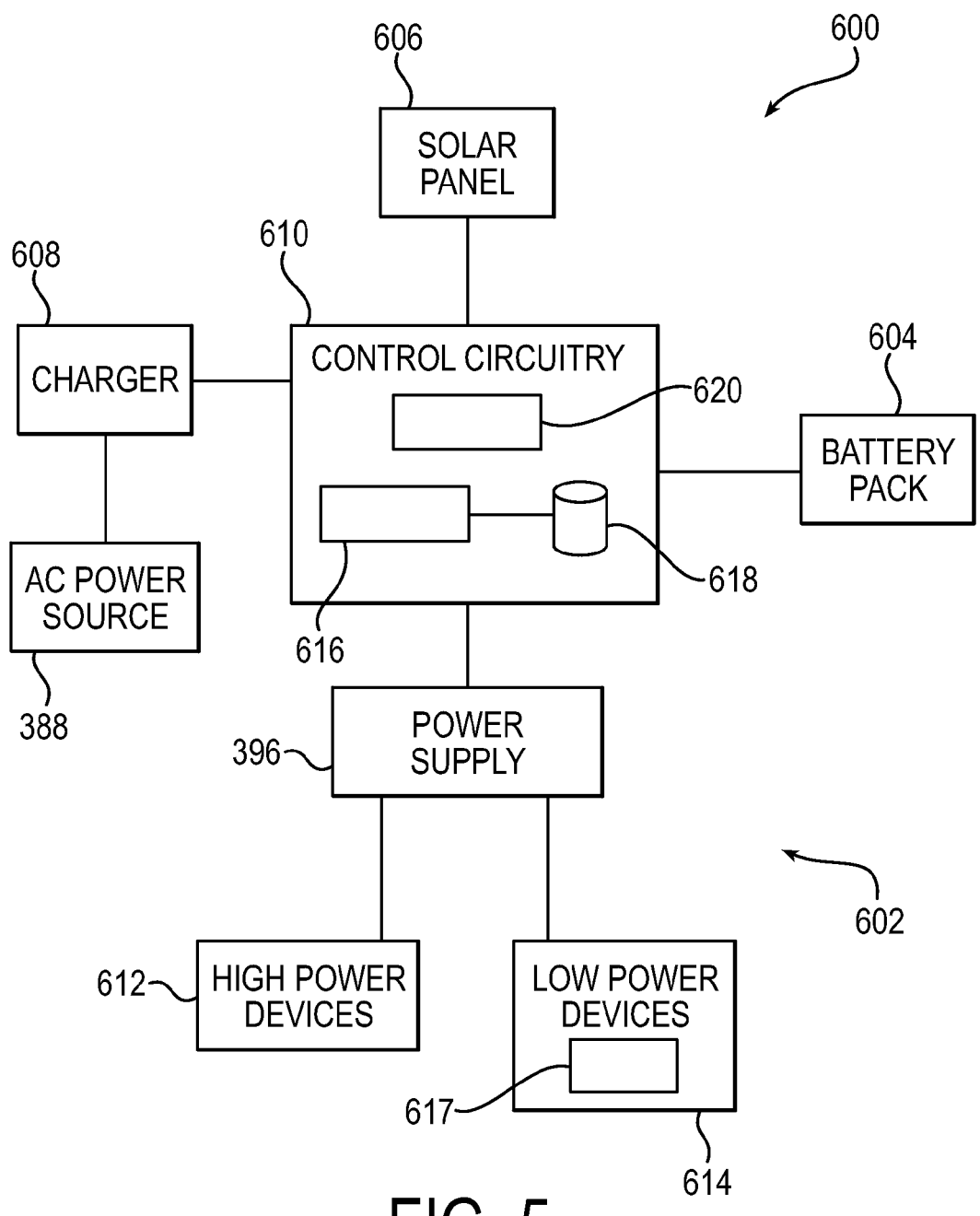
FIG. 5 is a schematic representation of an alternative example embodiment of a power control system for an automated banking machine.

It is not uncommon for power supplies used in automated banking machines of conventional design to be sized such that it meets the possible peak power demand of the devices which are included in the banking machine that could possibly run simultaneously plus some additional capability as a safety factor. The peak demand can be three to ten times more than the average demand, even though the peak demand may only last for a short time. For example, the near peak demand may last for ten seconds when printing a receipt and thirty seconds when dispensing cash. For most of the time, the machine is idling and requiring only a small fraction of the peak demand. This may be a power supply with much greater capability than is needed most of the time and inefficient operation by the power supply. FIG. 5 schematically shows another example embodiment of a power control system for an automated banking machine 600 that provides for more energy efficient operation of the machine 600. The machine 600 may have similar features to the machine 340 previously described except as discussed below. The example power control system 602 of this automated banking machine includes a battery pack 604 including one or more batteries, a solar panel 606, and a battery charger which is alternatively referred to herein as a charging circuit 608. These components are operatively connected to a power control circuit 610. The control circuit 610 is operatively connected to the power supply 396. In this example embodiment the power supply may include transformers and other circuitry operative to deliver electrical power to the devices at the level or levels required for their operation. The power supply 396 is operatively connected to high power consuming devices 612 such as the cash dispenser 352 and the thermal printer 350, or other high power consuming device and to low power consuming devices 614 such as the card reader 348, LED display 617, a keypad, low power printer, or other low power device. Although not indicated in the schematic diagram, example power supplies may include direct electrical connections to one or more of the battery pack, the solar panel, the battery charger or other power sources. Example embodiments may include relays or other components for operatively connecting and disconnecting the power sources and the power consuming devices. Of course it should be understood that these devices are example and other banking machine embodiments may include other types of devices such as cash acceptors, cash recyclers, check acceptors, wireless ports, cell phone transceivers, satellite transceivers and other devices useful in carrying out financial transfers or other types of transactions. Example embodiments may also include other power sources, such as for example, wind power electrical generators, fuel cells, gas or diesel powered generators and the like.

The control circuit 610 may include at least one processor 616 which is alternatively referred to herein as a controller, that may be included on one or more printed circuit board. The processor 616 may be in operative connection with at least one data store 618. The data store may include suitable forms of volatile and/or nonvolatile memory. The example control circuit 610 may include a power monitor circuitry 620 that monitors the power available from power sources such as the battery pack 604 and solar panel 606 and the power available from the battery charger 608. The at least one processor 616 is in operative communication with the monitor circuit 620. Processor 616 uses data corresponding to power thresholds stored in the data store 618 to determine if there is sufficient power available from these power source components 604, 606, 608 to operate the devices 612, 614 and the power supply 396.

The battery pack 604 when adequately charged is capable of providing sufficient power to run the high power consuming devices 612. The battery pack 604 may be charged by electrical power from the battery charger 608 when such charging is determined to be desirable by the control circuitry 610 and power from the charger is available. The example battery charger 608 is plugged into or otherwise operatively connected to the AC power source 388. In the example embodiment, the AC power source 388 may be a power outlet connected to household current that provides 110 volts of alternating current. The battery charger 608 may be a suitable device that draws relatively little power and converts the AC power to DC power. The battery charger provides power which is directed to the battery at times and at levels as determined by the control circuitry. In the example embodiment the control circuitry operates to vary the charging level so as to attempt to keep the battery generally fully charged, but also prevents overcharging. For example, the battery charger may be of the type that is used to power and charge a laptop computer battery and may be rated at 19.4V/5 A. Again, this is an example, and in other embodiments other power sources may be used.

The example control circuit 610 also enables the battery pack 604 to be charged from power generated by the solar panel 606. The control circuit 610 also enables the low power consuming devices 614 such as the card reader 348 and display 617 to be run from power received from the solar panel 606, if the processor 616 determines that there is sufficient solar power available from the solar panel 606. The example solar panel 606 may have a peak output of around 17V/4.6 A. Again, this is example, and in other embodiments other power sources may be used.

If the processor 616 determines that there is not sufficient electrical power available from the solar panel 606 to run the low power consuming devices when required, the control circuitry 610 operates in accordance with its programming to cause the power supply to deliver power from another source. The example control circuitry makes the power available through the battery charger from the AC power outlet 388 through the power supply to run the low power consuming devices 614. The control circuitry may also operate to use excess power available from the charger to charge the battery pack 604, if necessary. If power is lost from the power outlet 388, and power is not available from the solar panel 606, the control circuit 610 operates in accordance with its programming to cause the power from the battery pack 604 to be used to supply power to run the devices of the machine 600. This may be done in some embodiments by the control circuit operating to cause the power supply to operatively connect the battery pack to the devices through a relay in the power supply. The monitoring circuit also operates in accordance with programmed instructions stored in a data store associated with a processor of the control circuit to be sure that the battery is not overcharged (by reducing or stopping charging when the battery pack is fully charged) and is also not totally discharged (i.e., shuts machine off before the battery is depleted), since either condition would shorten the battery life. Of course other embodiments may perform other or different functions.

In an example embodiment, the control circuit 610 is also operative to supply electrical power to the terminal processor. The terminal processor in an example embodiment comprises a suitable computer including at least one processor and data store, which computer is alternatively referred to as a terminal processor. The terminal processor of the example embodiment receives power from the power supply 396 under the control of the control circuit 610. The terminal processor includes the programmed instructions and data suitable for operating the transaction function devices of the machine in order to carry out financial transactions. Such example transactions may include dispensing cash assessed to accounts of the user, accepting cash, checking account balances, adding credit to cell phone accounts and other transactions. Example embodiments may also include other features of the types previously described. This may include features for purposes of starting and shutting down the operation of the terminal processor and other devices of the machine. This may be accomplished in some embodiments through the operation of the power control circuitry or other suitable devices.

Figure 6:
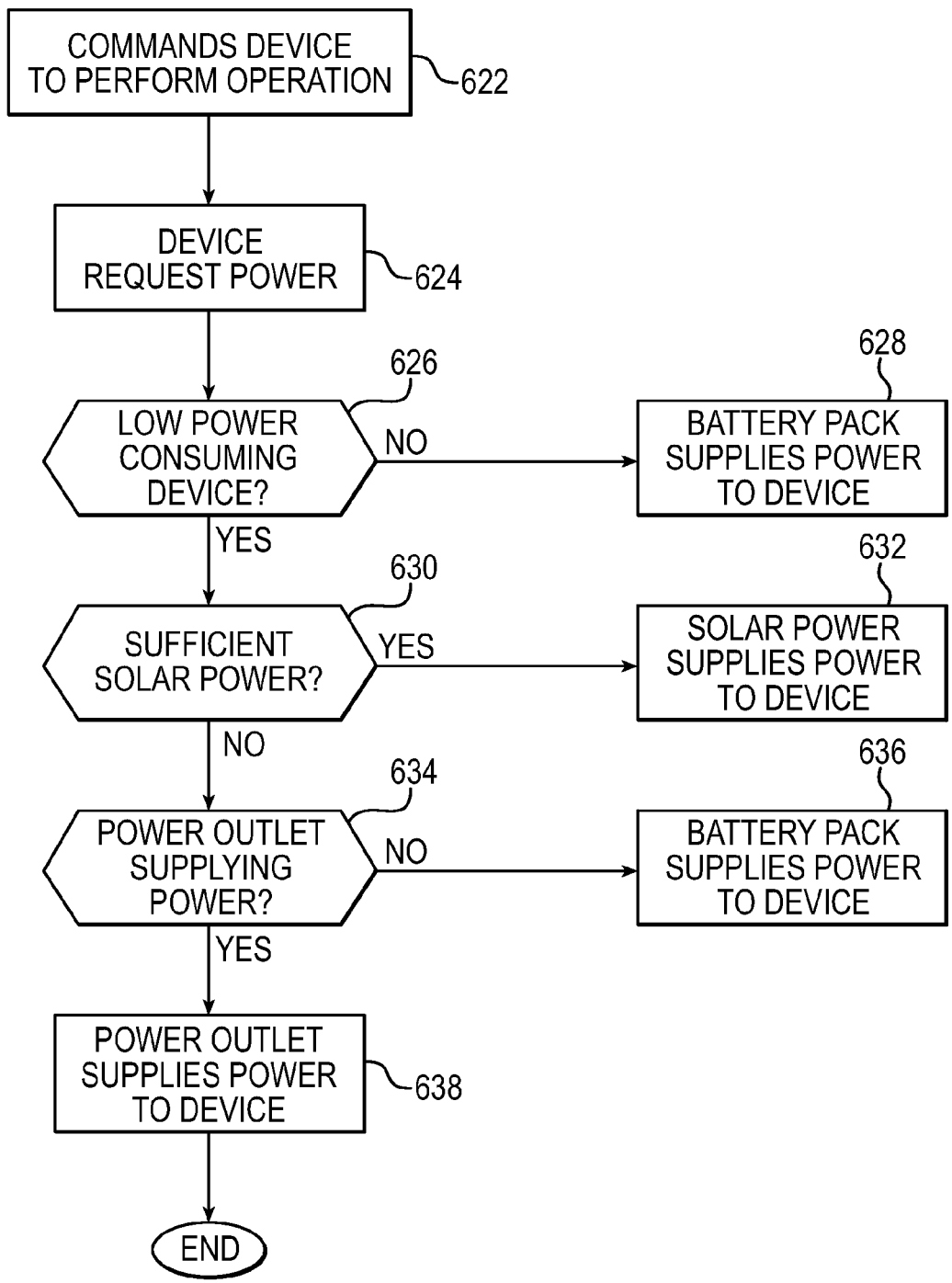
FIG. 6 is a schematic representation of steps for an exemplary process carried out by the power control system of FIG. 5.

An exemplary process involving the operation of the power control system 602 in response to a power request from one of the devices 612, 614 will now be discussed for further illustration in FIG. 6. In step 622, the central terminal processor or other controller for operation of the machine sends at least one message to one of the devices 612, 614 which corresponds to an instruction to perform an operation. In step 624, the device sends a message to the processor 616 corresponding to a request to perform the operation. In some embodiments the message may include data corresponding to the device and/or operation type. In other embodiments the at least one message may include data which indicates a predetermined amount of power needed to perform the operation. In step 626, the processor 616 determines whether the device is a low power consuming device 614 based on the power request. If the device is not a low power consuming device 614 and thus a high power consuming device 612, the control circuitry 610 operates to cause the battery pack 604 to be operatively in operative connection with the device by controlling the power supply to make power available for operation of the high power consuming device 612 to complete the operation of the device as represented by step 628.

If the power requested is indicative of operation of a low power consuming device 614, the processor 616 determines whether there is currently sufficient power available from the solar panel 606 to run the device as represented by step 630. If there is sufficient power available from the solar panel 606, the control circuitry 610 causes the power from the solar panel 606 to be operatively connected to supply the power to run the device. If or when additional power from the solar panel is available, the control circuitry may also operate to cause power from the solar panel to be operatively connected to and used to charge the battery pack as represented by step 632. If there is not sufficient power currently available from the solar panel 606, the control circuitry 610 determines whether the power outlet 388 and the battery charger has power available as represented by step 634. If the power outlet 388 and charger circuit is not capable of supplying power, the control circuit 610 causes power from the battery pack 604 to be operatively connected to and used to supply power to the low power consuming device 614 to complete the operation of the device as represented by step 636. If the power outlet 388 is charger from the power outlet 388 to be operatively connected to supply power to run the low power consuming device 614 to complete the operation. The control circuitry may also use excess power available from the battery charger when available to charge the battery pack 604 as represented by step 638. Of course similar steps may be taken with regard to other power sources that are included in exemplary systems.

When the machine is idle and not conducting a transaction, the machine may operate in accordance with the programming of its terminal processor to have its low power display 617 such as an LCD display present a message advising a user to insert a card or take another initial step if they wish to begin a transaction. The exemplary display and the terminal processor requires relatively little power to perform this operation. This amount of power is generally available from the battery charger 608 or during daylight from the solar panel 606. If a user inserts a card, the magnetic stripe of the card or other card data can be read responsive to one or more messages from processor 342. The LCD display then operates responsive to the processor to provide outputs that then prompts the user to input their PIN number through a keypad. The keypad may receive the PIN input responsive to the terminal processor 32. The keypad and the processor 342 that receives the PIN data of the exemplary embodiment consume relatively low power in performing these functions. Generally, in the exemplary machine these activities also require less power than is available from the battery charger 608 or from the solar panel 606, and the control circuit operates to make power from these power sources available to the devices through operation of the power supply.

When more power is needed to operate a high power consuming device 612, the control circuitry 610 enables power from the battery pack 604 to be available to operate the high power consuming device 612. The battery pack 604 may provide the power necessary through the power supply to cause the machine to communicate with a remote host computer through a cellular or satellite transceiver or a modem, to operate the motors and other electrical components of the cash dispenser 352 to dispense cash and/or to operate the motors, thermal print head, cutter and other electrical devices of printer 350 to print and deliver the receipt for the user, for example. Once this is done, the control circuitry 610 operates in accordance with its programming and/or communications from processor 342 to return to operating the machine 600 using minimal power from the solar panel 606, if the power is available in the solar panel 606, or from the battery charger, or other available power source.

This exemplary embodiment may allow the amount of power that must be provided through operation of the power supply to be significantly lower compared to that which might be used in other banking machines. For example, in some embodiments the power required from the power supply may be reduced from operating at hundreds of watts to under a hundred watts. For example, some example machines may require only a maximum 60 watt power supply. The smaller capacity power supply also operates more efficiently since it operates at a high efficiency more often at or nearly a full load. Hence, the example power supply avoids working at a low efficiency with a very light load as may occur in some conventional machines. Further, the exemplary power control system includes circuitry which provides a built-in uninterruptible power supply functionality from the battery pack and/or other available power sources and thus may obviate the need for a separate uninterruptible power supply. The circuitry of the exemplary embodiment operates to avoid interruption of power to the processor or other devices by assuring delivery of power thereto from another available sources. Also, multiple input power sources (the battery, solar panel, and power outlet) are used to better assure that power is available.

Moreover, when the other input power sources are not available, the power control system automatically switches the power supply or otherwise to make available power from the battery pack to supply the required power to perform required operations. The exemplary battery pack may be more efficient at supplying power than an uninterruptible power supply, since the battery pack does not have the energy losses from the AC/DC conversion of the power from the AC power source. The exemplary power control system also operates to cause at least one processor to monitor the battery charge level and charge and discharge history to prevent the over-charge or over-discharge of the battery. The exemplary power control system also operates in accordance with programmed instructions to prioritize the use of certain input power sources to supply needed power based on certain criteria. For example, the processor may operate to cause power from the solar panel to be used when available rather than draw power from the AC power source through the battery charger circuit. Of course in other example embodiments other power sources may be operatively connected to the machine and used to supply power for machine operation.

Further, while in some example embodiments described, at least some devices operate to communicate messages to the power control circuit to request power necessary to operate, other approach previously described in which the power control circuit operates in conjunction with or is integrated and operates as part of the terminal processor. For example. in some embodiments the programming of the terminal processor may include the capability to determine the power required to operate a device before a device is instructed to operate through messages sent responsive to operation of the terminal processor. The terminal processor may operate in accordance with its programming to cause the control circuit and/or the power supply to make power from the processor selected power source available to the device before or concurrently with the sending of one or more messages from the terminal processor to the device, which messages cause the device to perform one or more functions. Of course these approaches are exemplary and in other embodiments other approaches may be used.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. A non-volatile, tangible, computer readable medium of instructions with instructions encoded thereon for execution by a processor, and when executed operable to:
   selectively provide power from a plurality of power sources to a first set of devices associated with an automated banking machine and a second set of devices associated with the automated banking machine, the second set of devices consuming more power than the first set of devices;
   wherein the plurality of power sources comprise an alternate power source, a battery, and an external power source;
   wherein power is provided by a first set of power sources selected from the plurality of power sources to the first set of devices, the first set of power sources comprises the battery, the external power source, and the alternate power source,
   wherein power is provided by a second set of power sources selected from the plurality of power sources to the second set of devices, the second set of power sources comprise the battery and the external power source;
   determine an amount of power available from the alternate power source;
   determine an amount of power available from the battery;
   determine devices selected from the first set of devices and the second set of devices to employ to complete a financial transaction;
   selectively provide power to devices belonging to the first set of devices from the alternate power source responsive to determining the alternate power source has sufficient power;
   selectively provide power to devices belonging to the first set of devices from the battery responsive to determining that the alternate power source has insufficient power and the battery has sufficient power;
   selectively providing power to devices belonging to the first set of devices from the external power source responsive to determining that the alternate power source and the battery do not have sufficient power; and
   selectively provide power to devices from the second set of power sources based on available power from the power sources.

2. The computer readable medium of claim 1, further operable to:
   selectively provide power to devices belonging to the second set of devices from the battery responsive to determining that the battery has sufficient power; and selective providing power to devices belonging to the second set of devices from the external power source responsive to determining that the battery does not have sufficient power.

3. The computer readable medium of claim 2, wherein power from the alternate power source is not employed to provide power to the second set of devices.

4. The computer readable medium of claim 2, wherein the alternate power source is selected from a group consisting of solar power source and a wind power source.

5. The computer readable medium of claim 2,
wherein the external power source comprises a battery charger that is coupled with the battery; and
the instructions are further operable to employ power from the battery charger to charge the battery.

6. The computer readable medium of claim 2, wherein power from the alternate power source is employed to charge the battery.

7. The computer readable medium of claim 2, wherein the first set of devices includes a device selected from a group consisting of a reader that is operable to read user data that corresponds to financial accounts, a display, a receipt printer, a terminal processor, a keypad, and light emitting diodes associated with one of a group consisting of the reader, the receipt printer, and a cash dispenser.

8. The computer readable medium of claim 2, wherein the second set of devices includes a device selected from a group consisting of a cash dispenser and a thermal printer.

9. The computer readable medium of claim 2, wherein the plurality of power sources includes an electrical generator; and
the instructions are further operable to employ the electrical generator to selectively provide power to the first set of devices and the second set of devices responsive to determining that the alternate power source, battery, and external power source do not have sufficient power.

10. An apparatus comprising:
an automated banking machine operable to cause financial transfers responsive at least in part to data read from data bearing records, the automated banking machine comprises a terminal processor and a low power device selected from a group consisting of a reader that is operable to read user data that corresponds to financial accounts, a display, a first printer, and a keypad, and a high power device selected from a group consisting of a cash dispenser and a second printer;
wherein the terminal processor is in operative connection with the reader, the display, the printer and the cash dispenser,
a plurality of power sources including an external power source, and an alternative power source, and a battery;
wherein the alternative power source including one of a group consisting of a solar panel, an electrical generator, a fuel cell, a wind power source, or any combination thereof;
a power control processor;
the power control processor is operable to determine an amount of power available from the battery, and an amount of power available from the alternative power source;
the power control processor is operable to selectively couple a high power device to the battery in response to power requests received from the high power device where the battery has a sufficient power, and the power control processor is operable to selectively couple the high power device to the external power source responsive to power requests from a high power device where the battery does not have sufficient power; and
the power control processor is operable to selectively couple a low power device to the alternative power source for power requests where alternative power source has sufficient power, the power control processor is operable to selectively couple the selected device to the battery for power requests from a low power device when the solar panel does not have sufficient power for the request and the battery has sufficient power, and the power controller is operable to selectively couple the low power device to the external power source for power requests where neither the solar panel nor the battery have sufficient power.

11. The apparatus set forth in claim 10, wherein during the transaction the power control processor is operable responsive at least in part determining a loss of power from one of a group consisting of the external power source and the alternative power source currently being utilized for machine operation, to cause power from an other of the plurality of power sources to supply power to the low power and high power devices until at least the transaction is completed.

12. The apparatus set forth to claim 11, wherein the power control processor is operative to provide power to the high power devices from a different power source that is providing power to the low power devices.

13. The apparatus set forth in claim 10, further comprising a monitoring processor;
wherein the monitoring processor is operable to cause the battery to be charged with power from the alternative power source.

14. The apparatus set forth in claim 10, wherein the monitoring processor is operable to prevent the battery from being at least one of overcharged and over discharged.

15. The apparatus set forth in claim 10, wherein the power control processor is operable to operate responsive at least in part to loss of power from the one of the group consisting of the external power and the at least one alternative power source that continues after completion of the transaction, to cause power to be withdrawn from at least two of the group consisting of the terminal processor, the reader, the display and the cash dispenser at different times in a predetermined sequence.

16. The apparatus set forth in claim 10, wherein the power control processor is operable to withdrawal of power to a selected plurality of devices selected from of a group consisting of the low power source and the high power source responsive to determining that one of the plurality of power sources has lost power;
wherein power is removed from the selected plurality of devices in a predetermined sequence.

17. The apparatus set forth in claim 16, wherein power is removed from the selected plurality of devices in a predefined sequence.

18. The apparatus set forth in claim 16, wherein power is removed from the selected plurality of devices during different portions of a financial transaction being performed by the automated banking machine.

19. The apparatus set forth in claim 16, wherein power is restored to the plurality of selected devices responsive to power being restored to the one of the plurality of power sources that lost power.

20. A method, comprising:
determining an amount of power available from an alternate power source, the alternate power source comprises at least one of a group consisting of a solar panel, a wind power source, or both a solar panel and a wind power source;

determining an amount of power available from a battery;

determining whether power is available from an external power source;

wherein a power source for providing power to a device is selected from a first set of power sources for devices belonging to a first set of devices;

wherein a power source for providing power to a device is selected from a second set of power sources for devices belonging to a second set of devices;

selecting devices for performing a financial transaction that are selected from the first set of devices and the second set of devices, wherein the second set of devices consume more power than the first set of devices;

determining power requirements for the devices selected for performing the financial transaction;

selectively coupling devices selected from the first set of devices to the alternate power source responsive to determining the alternate power source has sufficient power;

selectively coupling devices selected from the first set of devices to the battery when the alternate power source has insufficient power;

selectively coupling devices selected from the first set of devices to the external power source when the alternate power source and battery have insufficient power;

selectively coupling a device selected from the second set of devices to the battery where the battery has a sufficient power, selectively coupling the high power device to the external power source responsive when the battery does not have sufficient power, wherein the first set of devices includes one of a group consisting of a terminal processor, keypad, display, receipt printer, and reader operable to obtain user data for determining a financial account for conducting a financial transaction; and wherein the second set of devices includes one of a group consisting of a cash dispenser and a thermal printer.

* * * * *